United States Patent [19]

Kobayashi et al.

[11] 4,267,581
[45] May 12, 1981

[54] MEMORY ADDRESS DESIGNATING SYSTEM

[75] Inventors: Ichiro Kobayashi, Kawasaki; Yoshiaki Moriya, Inagi; Yukio Kitagawa, Yokohama, all of Japan

[73] Assignee: Tokyo Shibaura Denki Kabushiki Kaisha, Japan

[21] Appl. No.: 17,572

[22] Filed: Mar. 5, 1979

[30] Foreign Application Priority Data

Mar. 6, 1978 [JP] Japan ................... 53-25280

[51] Int. Cl.³ .............................................. G06F 9/36
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,299,261 | 1/1967 | Steigerwalt, Jr. | 364/900 |
| 3,978,454 | 8/1976 | Willard | 364/900 |
| 4,021,781 | 5/1977 | Caudel | 364/900 |
| 4,031,514 | 6/1977 | Kihara | 364/200 |
| 4,073,006 | 2/1978 | Tubbs | 364/200 |

*Primary Examiner*—Gareth D. Shaw
*Assistant Examiner*—Eddie P. Chan
*Attorney, Agent, or Firm*—Finnegan, Henderson, Farabow, Garrett & Dunner

[57] ABSTRACT

A memory address designating system comprising a program counter and data counter for holding the addresses of an instruction word area and data area respectively of a memory, an increment/decrement counter for modifying the address, and gate circuits for controlling data transfer between the program counter, data counter and increment/decrement counter, in which, when the memory is accessed by the addresses of the instruction word area and data area of the memory, an address held in the program counter is modified by an increment/decrement counter and consequently is incremented by one and sent through a gate to the data counter where it is held. On the other hand, the address of the data area held in the data counter is supplied through a gate to he program counter and then to the increment/decrement counter where it is modified. At the same time, the data of the data area of the memory is fetched and the modified address is supplied to the data counter while the modified address stored in the data counter is supplied to the program counter.

8 Claims, 9 Drawing Figures

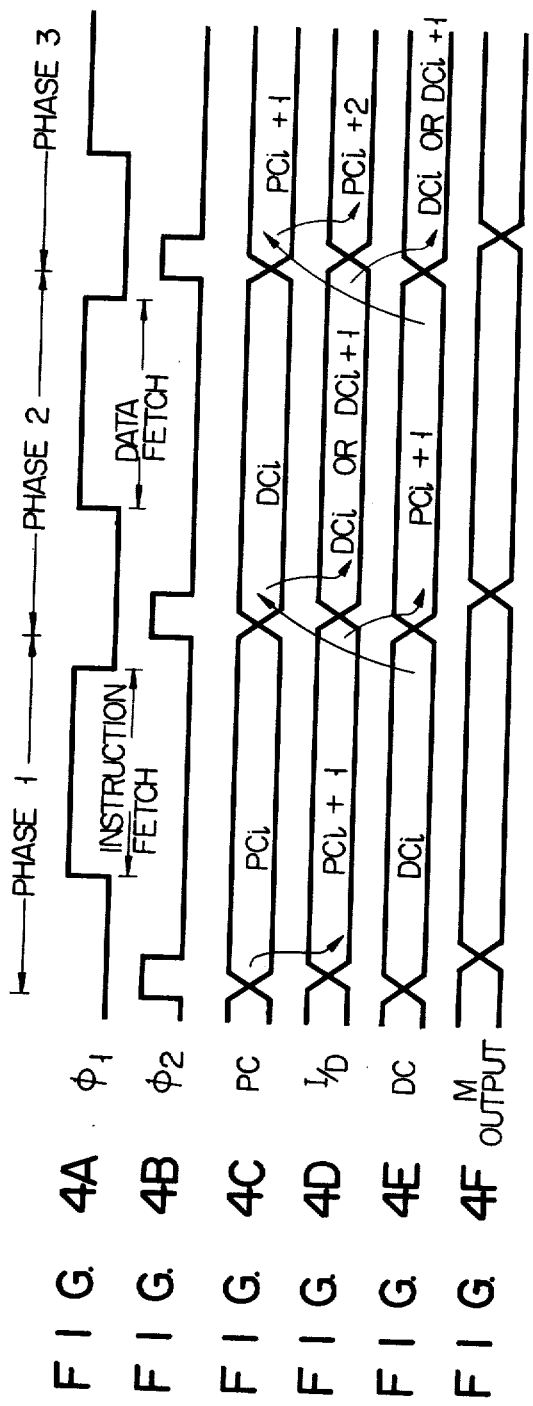

MEMORY ADDRESS DESIGNATING SYSTEM

BACKGROUND OF THE INVENTION

This invention relates to a memory address designating system for a data processing apparatus.

PRIOR ART OF THE INVENTION

It is sometimes desired that readout of a memory such as a Read Only Memory (ROM) be effected by alternately address-designating an instruction word area and data area of the ROM. When, for example, the fundamental bit configuration of an instruction group is 8 bits (1 byte) and data to be processed is 4 bits, two kinds of data can be stored in a location of the ROM as defined by the same address of the ROM. Now suppose that the following instructions are read out of ROM so as to read out ROM data.

(I) LRL instruction (Load Lower ROM Data instruction)

(AC)←(ROM L [DC])

(II) LRH instruction (Load Higher ROM Data instruction)

(AC)←(ROM H [DC])

(DC)←(DC)+1

An address for designating the data area of the ROM is stored in a data counter (DC). The lower 4-bit portion of data stored in the location of the ROM as defined by an address is loaded into an accumulator (ACC) by the above-mentioned LRL instruction. After the LRL instruction is executed, the upper 4-bit portion of data stored in the location of the ROM as defined by the same address as that of the ROM which is indicated by the data counter (DC) is stored in the accumulator by the LRH instruction.

After the LRH instruction is executed, the contents of the data counter (DC) is incremented by one (an address for designating the data area of the ROM is incremented) and, in consequence, a data table in the ROM can be continuously read out. The data area of the ROM can be effectively utilized by using the above-mentioned instructions.

The above-mentioned instructions are normally executed by fetching in one machine cycle the instruction word by the address of the program area stored in a program counter and, in the next machine cycle, data by the address of the data area stored in a data counter. In order to effect such an operation, a conventional system requires a switching circuit for effecting switching between the data counter and the program counter for designating the address of the memory. Furthermore, an INHIBIT circuit for inhibiting a count-up of the program counter is also required, since during the second machine cycle inconvenience is involved due to the count-up of the program counter. One example of such a machine is the 8-bit microprocessor 8080A (Intel Corporation). In this microprocessor, an instruction of the address PCi is fetched by the same timing as when the contents PCi of the program counter is incremented to PCi+1. In order to deliver the address PCi data to an address bus, therefore, an address latch circuit is required. Furthermore, a complicated control signal is necessary to initiate the timing for again loading into the program counter, address data PCi+1 which is incremented by an increment/decrement circuit.

SUMMARY OF THE INVENTION

One object of this invention is to provide a memory address designating system free from the above-mentioned disadvantages.

Another object of this invention is to provide a data processing apparatus adopting the above-mentioned memory address designating system.

According to this invention there is provided a memory address designating system comprising a memory for storing a program or data; a first register connected to the memory to designate a location of the memory which is defined by a first address; a second register connected to the first register to designate a location of the memory which is defined by a second address; an address modifying circuit connected to the first and second registers to modify the address set to the first register, gate circuits connected between the first and second registers and between the address modifying circuit and the first and second registers, and means for supplying control signals to the first and second registers, address modifying circuit and gate circuits, the improvement comprising a first loop for modifying the first memory address from the first register by the address modifying circuit, for supplying it to the first register through the gate circuit and for designating a location of the memory which is defined by the first memory address, and a second loop for modifying the first memory address from the first register by the first memory address, for supplying it to the second register while at the same time supplying the second memory address held in the second register to the first register, and for alternately designating a location of the memory defined by the first address and a location of the memory defined by the second address.

BRIEF DESCRIPTION OF THE DRAWINGS

This invention will be further described by way of example by referring to the accompanying drawings in which;

FIGS. 4A to 4F are timing diagrams showing the operation of a block structure of FIG. 2.

DETAILED DESCRIPTION OF THE PREFERRED EMBODIMENT

Figure 1:
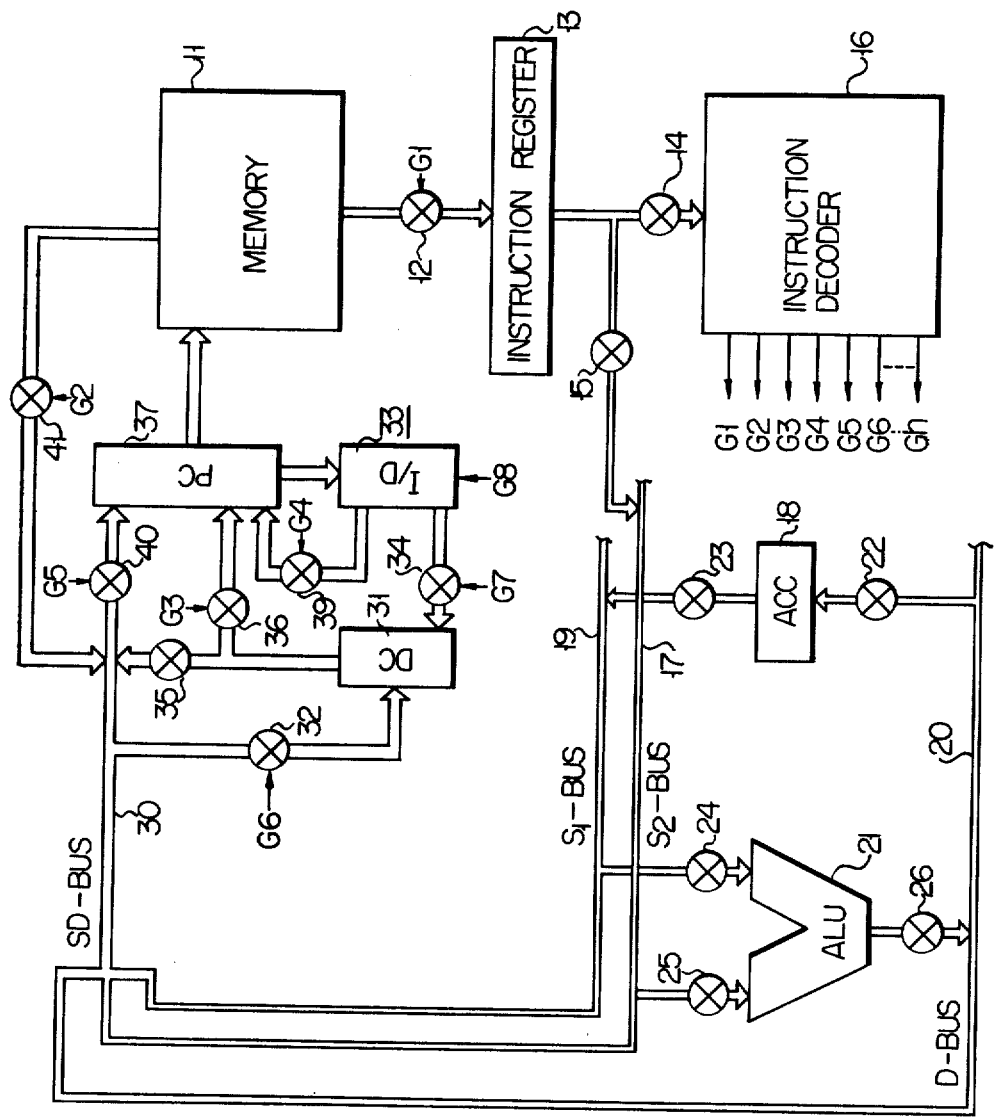
FIG. 1 is a block diagram showing a data processing apparatus adopting a memory address designating system according to one embodiment of this invention.

FIG. 1 shows one form of a data processing apparatus adopting a memory address designating system of this invention. In FIG. 1, 11 shows a memory for storing a program and data therein. The memory 11 is constructed of, for example, a read only memory (ROM). The output of the memory 11 is connected through a gate 12 to an instruction register IR 13. The output of the memory 11 is connected through the gate 41 to a bus SD as will be later described. The instruction register 13 holds instruction data which is outputted from the memory 11. The instruction register IR 13 is connected through a gate 14 to an instruction decoder 16 and through a gate 15 to a bus $S_2$($S_2$-BUS) 17. The instruction decoder 16 decodes instruction data outputted from the instruction register 13 to deliver various control signals to the corresponding gates to be later described. An accumulator 18 is connected to a bus $S_1$($S_1$-BUS) 19 and to a bus D(D-BUS)20 to hold data supplied from the bus D(D-BUS)20 and deliver an output to the bus $S_1$($S_1$-BUS)19.

An arithmetic and logic unit (ALU)21 is connected respectively through gates 24, 25 and 26 to the buses $S_1$-BUS19, $S_2$-BUS17 and D-BUS20 to effect an arithmetic calculation, or a logical calculation, of data which are supplied from the $S_1$-BUS19 and $S_2$-BUS 17. The result of the calculation is supplied to the bus D-BUS20. The input of a data counter (DC)31 is connected through a gate 32 to the bus SD-BUS30 constituted of the buses $S_1$-BUS19, $S_2$-BUS17 and D-BUS20, and through a gate 34 to an increment/decrement counter 33. The output of the data counter 31 is connected through a gate 35 to the bus SD-BUS 30 and through a gate 36 to a program counter PC 37 to be later described.

The data counter DC 31 holds data outputted from the increment/decrement counter 33 or data inputted from the bus SD-BUS and delivers an output to the program counter 37. The input of the increment/decrement counter 33 is connected to the output of the program counter 37 and the output of the increment/decrement counter 33 is connected through a gate 39 to the input of the program counter 37. The increment/decrement counter 33 increments or decrements a count value which is outputted from the program counter PC 37. The program counter PC 37 is connected through a gate 40 to the bus SD-BUS 30. The program counter 37 holds the address of each address location of the memory 11.

Figure 2:
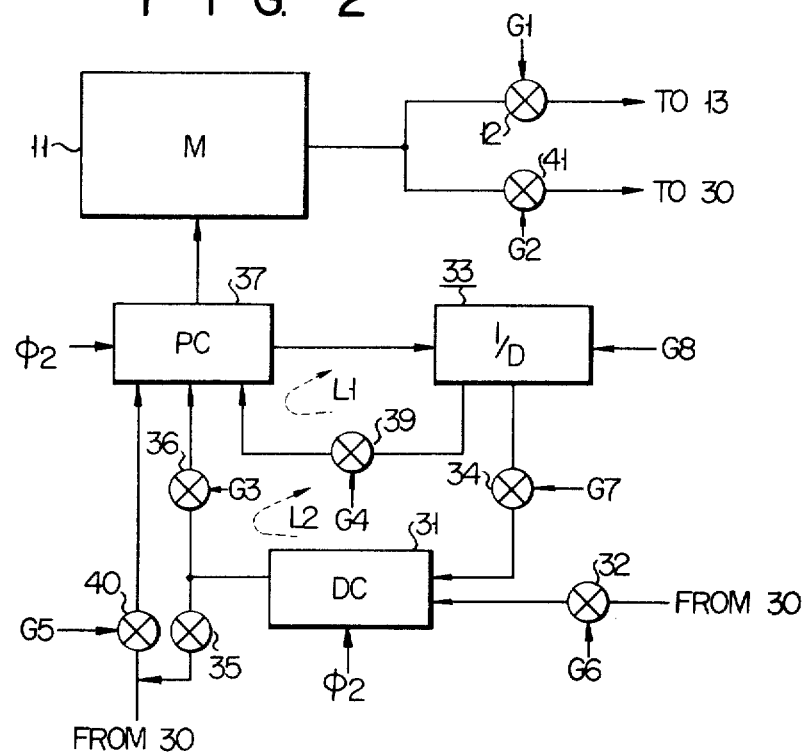
FIG. 2 is a block diagram illustrating explanatory view for embodying the memory address designating system of FIG. 1.

FIG. 2 shows an essential part of the data processing apparatus adopting the memory address designating system of this invention.

The output of the memory 11 is supplied to gates 12 and 41. When the contents supplied to the gate 12 is an instruction word, the gate 12 is opened by a control signal G1 which is supplied to the gate 12, to supply the instruction word to the instruction register 13. The control signal G1 is a timing signal $\phi_1$ as shown in FIG. 4A which is supplied to the gate 12.

When the contents supplied to the gate 41 is data, the gate 41 is opened by a control signal G2 to cause the data to be delivered to the bus SD-BUS 30. The control signal G2 is a timing signal $\phi_1$ as shown in FIG. 4A which is supplied to the gate 41.

The output of a program counter 37 is connected to the input side of the memory 11. The inputs of the program counter 37 are connected respectively through the gates 39, 36 and 40 to the increment/decrement counter (I/D counter) 33, data counter 31 and bus SD-BUS 30 (see FIG. 1). The program counter 37 receives, in response to a timing pulse $\phi_2$ as shown in FIG. 4B, address data from any one of the I/D counter 33, data counter 31 and bus SD-BUS 30 and designates the address of the memory 11 based on this address data. The gate 36 is ON-OFF controlled by a control signal G3. The control signal G3 is produced by a timing pulse $\phi_1$ when a gate OPEN instruction is executed. The gate 39 is ON-OFF controlled by a control signal G4. The control signal G4 is produced by the timing pulse $\phi_1$ when a gate OPEN instruction is executed. The gate 40 is ON-OFF controlled by a control signal G5. The control signal G5 is produced when an instruction, such as a JUMP instruction or CALL instruction, for permitting a given memory address to be loaded into the program counter 37 is executed. The other output of the program counter 37 is connected to the increment/decrement counter 33. The counter 33 increments or decrements an output value, by one, which is delivered from the program counter 37.

Figure 3:
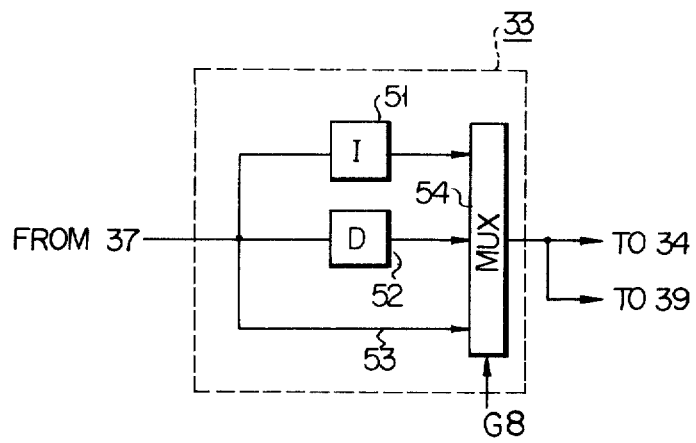
FIG. 3 is a detailed block diagram showing the increment/decrement counter of FIG. 2.

FIG. 3 shows the details of the I/D counter 33. The I/D counter comprises an incrementer 51 for incrementing an output value, by one, which is delivered from the program counter 37, a decrementer 52 for decrementing the output value, by one, which is delivered from the program counter 37, and a bypass 53 for permitting the output value from the program counter 37 to pass therethrough. The outputs of the incrementer 51, decrementer 52 and bypass 53 are applied to a multiplexer 54. The multiplexer 54 receives a control signal G8 from the instruction decoder 16 to enable selectively one of the three inputs thereof to deliver a corresponding output signal to the gates 34 and 39. The control signal G8 is produced by the timing pulse $\phi_2$ and the output of the incrementer 51 is normally selected as an output of the multiplexer 54. The gate 34 is connected between the I/D counter 33 and the data counter 31 and is opened by the control signal G7 to cause an output from the I/D counter 33 to be supplied to the data counter 31. The control signal G7 is produced by the timing pulse $\phi_1$ when the gate OPEN instruction is executed.

The data counter 31 receives, in response to the timing pulse $\phi_2$, address data from the gate 34 and sends it to the gate 36. The other input of the data counter 31 is connected through the gate 32 to the bus SD-BUS 30 and the gate 32 is opened by the control signal G6 to cause data on the bus SD-BUS 30 to be supplied to the data counter 31.

The control signal G6 produces a timing pulse $\phi_1$ when a data SET instruction of the data counter 31 is executed. Thus, an arbitrary data value can be set into the data counter 31. The program counter 37, I/D counter 33 and gate 39 constitute a first loop $L_1$, and the program counter 37, I/D counter 33, gate 34, data counter 31 and gate 36 constitute a second loop $L_2$.

The address designation will be explained by referring to the timing chart of FIG. 4 and explanation will be first given to the case where address data passes through the loop $L_1$. As an instruction there is listed, for example, a logic operation instruction, bit processing instruction, branch instruction, jump instruction etc., the instruction is executed by the following fundamental operation. When an address is stored in the program counter 37 by a timing pulse $\phi_2$ of phase 1 as shown in FIG. 4B (suppose that at this time the value of the program counter 37 is PCi), the contents of the program counter 37 is applied to the I/D counter 33 and the contents of the I/D counter 33 is incremented by one by the incrementer 51 to obtain PCi+1. At this time, an instruction (the contents of PCi of ROM) is fetched by timing pulse $\phi_1$ of the phase 1 as shown in FIG. 4A and loaded into the instruction register 13. The instruction loaded is decoded by the instruction decoder 16. As a result, upon the occurrence of the timing pulse $\phi_2$ during the next phase, i.e., during phase 2 control signals G4 etc. are produced and an operation inherent in the instruction is executed. The incremented value PCi+1 is applied to the gate 39. Since the gate 39 is opened by a control signal G4, the value PCi+1 of the gate 39 is supplied to the program counter 37. In this way, an operation corresponding to phase 1 is completed.

By the timing pulse $\phi_2$ corresponding to the next phase, PCi+1 is loaded into the program counter 37, the address of the memory 11 is designated and the next instruction is read out. In this way, the instruction is sequentially read out in the loop L₁ and executed.

The execution of, for example, a JUMP instruction is effected as follows. The operation of the phase 1 is the same as the fundamental operation except that when a JUMP instruction is decoded by the instruction decoder 16, control signals G4, G5 and G2 are produced. At this time, the control signal G4 is produced by the timing pulse $\phi_1$ of phase 1 and the control signals G5 and G2 are produced by the timing pulse $\phi_1$ of phase 2.

The explanation of phase 2 will be given below. When data PCi+1 is loaded through the gate 39 to the program counter 37 by the timing pulse $\phi_2$ of phase 2 as shown in FIG. 4B, it is supplied to the I/D counter 33 to cause it to be incremented by +1 to permit the contents of the I/D counter 33 to become PCi+2. At this time, address data (the contents of the location in the ROM as defined by the address PCi+1) representing a JUMP address is fetched to gate 41. At the same time, control signals G2 and G5 are produced by the timing pulse $\phi_1$ of phase 2 and the gates 41 and 40 are opened by the control signals G2 and G5, respectively. The address data representative of the JUMP address is supplied through the bus SD-BUS to the program counter 37. For this reason, the incremented value PCi+2 is not used. Thus, the operation of the phases 1 and 2 is completed.

By the timing pulse $\phi_2$ of the next phase the JUMP address is loaded into the program counter 37 and the address of the memory 11 is designated. As a result, a new instruction is read and executed.

In the above-mentioned example the example the instruction address passes through the loop L₁ once during phase 1 and once during phase 2, thus performing the instruction.

Explanation will now be given to the case where the address data passes through the loop L₂.

In this case, for example, ROM data readout instructions LRL, LRH etc. can be listed as instructions. The LRL instruction, for example, can be executed as follows. When an address is loaded into the program counter 37 by the timing pulse $\phi_2$ of the phase 1 as shown in FIG. 4B (now suppose that the contents of the program counter 37 is PCi), PCi is applied to the I/D counter 33 to cause it to be incremented by one by the incrementer 51. As a result, PCi+1 is obtained (see FIG. 4D). At this time, the instruction (the contents of the PCi of ROM) is fetched to the instruction register 13 by the timing pulse $\phi_1$ of the phase 1 as shown in FIG. 4A. The fetched instruction is decoded by the instruction decoder 16 and control signals G3, G7, G8 and G2 are produced.

At this time, the control signals G3 and G7 are produced by the timing pulse $\phi_1$ of phase 1 and the control signal G8 is produced by the timing pulse $\phi_2$ of phase 2. The control signal G2 is generated by the timing pulse $\phi_1$ of phase 2. The incremented value PCi+1 is supplied to the gate 34 and to the data counter 31 upon the occurrence of timing signal $\phi_2$ of phase 2 (see FIG. 4E) when the gate 34 is opened by the control signal G7. Now suppose that at phase 1 the contents of the data counter 31 is DCi, then DCi is supplied to the gate 36. When the gate 36 is opened by the control signal G3, DCi which was supplied to the gate 36 is supplied to the program counter 37. In this way, phase 1 operation is completed and the phase 2 operation is started. By the timing $\phi_2$ of the phase 2, DCi is loaded through the gate 36 to the program counter 37 and by the same timing $\phi_2$ PCi+1 is loaded through the gate 34 into the data counter 31. That is, by the timing $\phi_2$ of phase 2, DCi is loaded into the program counter 37 and data PCi+1 into the data counter 31 (see FIGS. 4C, 4D and 4E). The address DCi on the program counter 37 is supplied to the I/D counter 33. At this time, the control signal G8 based on the LRL instruction is produced by the timing pulse $\phi_2$ of phase 2 and the values of the bypass 53 are selected, by the control signal G8, at the multiplexer 54. That is, the address DCi stored in the program counter 37 is applied to the I/D counter 33 and then to the gate 34 in the form of DCi. At this time, data (the contents of the location of ROM as defined by the address DCi) is fetched, by the timing $\phi_1$ of phase 2 of FIG. 4A, for supplying to the gate 41. At the same time, a control signal G2 is produced by the timing pulse $\phi_1$ and it is delivered from the bus SD 30 to the bus D-BUS 20. In this way, phase 2 operation is completed and phase 3 operation is started.

By the timing $\phi_2$ of phase 3, the contents PCi+1 of the data counter 31 is loaded into the program counter 37 through the gate 36. By the same timing $\phi_2$, DCi passed through the gate 34 is loaded into the data counter 31. That is, PCi+1 is loaded into the program counter 37 by the timing $\phi_2$ of phase 3 and DCi into the data counter 31 (see FIGS. 4C, 4D, 4E). The contents PCi+1 of the program counter 37 is applied to the I/D counter 33. At this time, the value of the incrementer 51 is selected, by the control value G8, at the multiplexer 54 so that a normal operation is effected. For this reason, PCi+2 is supplied to the gates 34 and 39. The above-mentioned data (the contents of the location of ROM as defined by the address DCi) supplied to the bus D-BUS 20 passes through the gate 32 and is stored in the accumulator 18 by the timing $\phi_2$. The address of the memory 11 is designated by the contents PCi+1 of the program counter 37 and the next instruction is read out. As in the above-mentioned case, the program data of the program counter 37 and data counter 31 pass through the loop 2 during phases 2 and 3. By so doing, DCi is loaded into the program counter 33 during phase 2 and PCi+1 into the program counter 33 during phase 3, and PCi+1 is loaded into the data counter 31 during phase 2 and DCi into the data counter 31 during phase 3. In this way, a ROM readout operation is effected.

Although the value of the bypass 53 is selected at the multiplexer 54 by the timing $\phi_2$ of phase 2 so as to obtain an output of the I/D counter 33, the value of the incrementer 51 and decrementer 52 can also be selected. If, for example, the value DCi+1 of the incrementer 51 is selected by the control signal G8 of phase 2 to obtain an output of the I/D counter, a ROM readout operation can be effected based on the LRH instruction which is executed in the same procedure as the LRL instruction. The arrangement of the above-mentioned loop permits a featuring operation when the above-mentioned instruction is executed. Even in the following example, the loop circuit can be effectively used.

The execution of the CALL instruction will now be explained below by way of example. Suppose that PCi is an address loaded into the program counter 37 by the timing pulse $\phi_2$ of phase 1. PCi is supplied to the I/D counter 33 to obtain PCi+1. An instruction is fetched by the timing pulse $\phi_1$ and loaded into the instruction register 13. The loaded instruction is decoded by the instruction decoder 16 with the result that various control signals are generated. PCi+1 passes through the gate 39 by the timing pulse $\phi_2$ of phase 2 and loaded into the program counter 37 and then to I/D counter 33. As a result, PCi+2 is obtained.

Address data corresponding to the beginning address of a subroutine is fetched by the timing $\phi_1$ and loaded into the program counter through the gates 41 and 40. PCi+2 passes through the gate 34 by the timing $\phi_2$ of phase 3 and loaded into the data counter 31. That is, a return address PCi+2 in the main program is loaded into the data counter 31. By the timing pulse $\phi_1$, the instruction at the starting address of the subroutine is fetched and executed. When, subsequent to shifting the execution of the instruction from the main program to the subroutine, an instruction is shifted from the subroutine back to the main program, the return address of the main program which is the contents of the data counter is loaded into the program counter 37. In this way, instructions are sequentially executed.

In the LRL and LRH instruction modes, the instruction area and data area of the ROM are alternately address-designated. In this case, the address of the data area which is loaded initially into the program counter makes one circulation while being modified in the loop circuit. This comprises a most important feature of this invention. In the CALL instruction mode the data counter can be used, as a storage device for temporarily storing the return address of the main program, while using the loop circuit L2.

According to the memory address system of this invention, a circuit is provided which is very effective when an instruction and data are read out from a ROM through the skillful utilization of the loop circuit L1 on the loop circuits L1 and L2. This obviates the necessity of providing a switching circuit for the loop circuit which effects switching between the program counter and the data counter, as well as an INHIBIT circuit for inhibiting the contents of the program counter from being incremented during the data fetch phase 2. The incrementing, decrementing and nonmodifying of the memory address can be readily controlled by the control signal G8.

Although in the above-mentioned embodiment a read only memory (ROM) is used, a memory such as a random access memory (RAM) etc. can be used. In the above-mentioned embodiment the I/D counter is inserted into the data output path of the program counter 37. The I/D counter may be inserted into the data input path of the program counter 37. In this case, a loop circuit corresponding to the loop L1 is of course provided between the I/D counter 33 and the program counter 37.

What we claim is:

1. A memory address designating system comprising:
    a memory for addressably storing program data and non-program data;
    a first register coupled to said memory for storing a first address designating a first location in said memory;
    a second register for storing a second address designating a second location in said memory;
    an address modifying circuit coupled to said first register for selectively modifying said first address stored in said first register;
    a first loop transfer path including a first gate circuit coupling the output of said address modifying circuit to said first register to enable a selective transfer of an address in said first loop transfer path comprising said first register, said address modifying circuit, and said first gate circuit;
    a second loop transfer path including a second gate circuit coupling the output of said address modifying circuit to said second register and a third gate circuit coupling said second register to said first register to enable a selective transfer of an address in said second loop transfer path comprising said first register, said address modifying circuit, said second gate circuit, said second register, and said third gate circuit; and
    a transfer path controlling means coupled to said stored memory and responsive to said stored program data and non-program data for controlling said first, second, and third gate circuits, said first register, said second register, and said address modifying circuit to (1) enable the transfer of a said address from said first register to said address modifying circuit to generate a modified first loop address and control said first gate circuit to enable the transfer of said modified first loop address back to said first register, and (2) enable the simultaneous transfer of said address from said first register to said address modifying circuit to generate a modified second loop address and the transfer of said modified second loop address to said second register, and said address from said second register through said first register to said third gate circuit.

2. A memory address designating system according to claim 1 wherein said address modifying circuit comprises:
    an incrementer for incrementing by one said memory address stored in said first register;
    a decrementer for decrementing by one a said address stored in said first register;
    a bypass circuit for supplying a non-modified address stored in said first register; and
    a multiplexer coupled to said incrementer, said decrementer, and said bypass circuit to select the outputs thereof.

3. A memory address designating system according to claim 1 wherein said first transfer path performs the accessing of said program data within said memory and said second transfer path performs the accessing of said non-program data stored in said memory.

4. A data processing apparatus comprising:
    a bus;
    memory means for storing program data and non-program data and for selectively outputting to said bus said program data and said non-program data;
    instruction register means coupled to said memory means to store said outputted program data and non-program data;
    instruction decoding means connected to said instruction register means to produce various control signals from said stored program data and non-program data;
    an accumulator connected to said bus to store data transferred on said bus;
    arithmetic and logic means coupled to said instruction decoding means and said accumulator means through said bus to perform arithmetic and logic calculations on said program data and said non-program data transferred on said bus in accordance with said control signals;

memory addressing means coupled to said memory means for storing the address of a location in said memory means;

address modifying means coupled to said memory addressing means for selectively modifying an address stored in said memory addressing means;

first gate means coupled between said memory addressing means and the output of said address modifying means to control the transfer of an address from said address modifying means to said memory addressing means in accordance with said control signals;

register means coupled between the output of said address modifying means and said memory addressing means for supplying an address outputted from said address modifying means to said memory addressing means;

second gate means coupled between the output of said address modifying means and said register means to control the selective transfer of a said address from said address modifying means to said register means in accordance with said control signals; and third gate means coupled between said register means and said memory addressing means to control the transfer of a said address from said register means to said memory addressing means in accordance with said control signals whereby said address modifying means, said first gate means and said memory addressing means together comprise a first loop transfer path to enable the transfer of a said address from said memory addressing means to said address modifying means to generate a modified first loop address for transfer to said address modifying means through said first gate means in accordance with said control signals, and said memory addressing means, said address modifying means, said second gate circuit, said register means, and said third gate circuit together comprise a second loop transfer path to enable the simultaneous transfer of a said address from said memory addressing means to said address modifying means to generate a modified second loop address and the transfer of said modified second loop address to said register means through said second gate means and a said modified second loop address from said register means to said memory addressing means through said third gate in accordance with said control signals means.

5. A data processing apparatus according to claim 4 wherein said memory addressing means comprises a program counter.

6. A memory address designating system according to claim 5 wherein said address modifying circuit comprises:

an incrementer for incrementing by one said memory address stored in said first register;

a decrementer for decrementing by one a said address stored in said first register;

a bypass circuit for supplying a non-modified address stored in said first register; and a multiplexer coupled to said incrementer, said decrementer, and said bypass circuit to select the outputs thereof.

7. A data processing apparatus according to claim 4 wherein said register means includes means for alternately storing the address of said program data and said non-program data stored in said memory means.

8. A memory address designating system for selectively performing a first memory access method for accessing addresses of program data stored in a program data storing area of a memory and a second memory access method for alternately accessing addresses of program data stored in said program data storing area of said memory and non-program data stored in a non-program data storing area of said memory, said first memory access method comprising the steps of:

storing in a first register the address of a location of a program data stored in said program data storing area of said memory;

selectively modifying said address stored in said first register to form a modified program data address;

fetching an instruction stored in said memory at said location corresponding to said modified program data address;

decoding in an instruction word decoding means said instruction fetched from said program data storing area; and controlling a first gate circuit connecting said first register and said address modifying means to transfer said modified program data address to said first register for storage therein; and wherein said second memory access method comprises the steps of:

modifying a first address stored in said first register by said address modifying means to produce a modified first address;

fetching the instruction word in said program data storing area located at said modified first address;

decoding said fetched instruction word;

controlling a second gate circuit connecting said address modifying means and a second register in accordance with said decoded instruction word to transfer said modified first address to said second register and simultaneously controlling a third gate circuit connecting said second register to said first register to transfer an address stored in said second register designating a location in said non-program data storing area to said first register;

modifying in said modifying circuit said address stored in said first register corresponding to a said location in said non-program storing area of said memory;

fetching a data word stored at said modified non-program data address; and simultaneously supplying said modified non-program address to said second register for storage therein while transferring said modified program data address previously stored in said second register from said second register to said first register for storage therein.

* * * * *